Patented Sept. 1, 1942

2,294,461

UNITED STATES PATENT OFFICE 2,294,461

PROCESS OF CLARIFYING SPENT SOLVENTS

Colin C. Jones, Inglewood, Calif., assignor to Chemical Reclaiming Sales Co. Inc., Los Angeles, Calif.

No Drawing. Application August 27, 1940,
Serial No. 354,453

2 Claims. (Cl. 196—15)

This invention relates to the clarifying of spent solvents and more particularly to a process for clarying and recovering cleaning fluid such as that used in the conventional dry cleaning process and in use having absorbed and accumulated therein oleaginous substances, dirt particles, filth and other foreign matter, thereby rendering the cleaning fluid unfit for further use.

Installed in dry cleaning establishments, in general, at the present time, is an inverted cone-shaped tank, or, at least, a tank the upper portion of which may be of any desired or essential shape but the bottom portion of which is in the form of an inverted hollow cone, this conical bottom portion of the tank being usually filled with some kind of a caustic solution, and the dirty solvent, or "spent solvent" as it is commonly termed, after being used until it is so completely filled with foreign matter that it is no longer fit for use, is pumped into the tank and allowed to percolate through the bed of caustic solution in the bottom of the tank.

The foregoing described process is not entirely satisfactory for the reason that there is always a small amount of the caustic solution carried into the reclaimed solvent, and although the caustic solution in small quantities does not appreciably injure the clothes or articles, if it is allowed to permeate the reclaimed solvent to any material extent, it causes the clothing or articles thereafter treated therewith to deteriorate and fall to pieces much faster than when treated with the cleaning fluid in its original form. Furthermore, in the reclaiming process employing the caustic solution as just above described, the oils in the spent dirty solvent are not separated from the emulsion including the original constituents of the cleansing fluid, but remain therein, and as thus retained in the reclaimed solvent the oils have a tendency to leave an odor in the clothing or articles cleaned with the reclaimed product.

Other processes have been resorted to in the clarification and reclamation of spent dry cleaning fluids with more or less success, but without complete satisfaction, because the elimination of the objectionable oleaginous matter is not ideally accomplished to the desired degree, and, furthermore, in the carrying out of these processes, as well as the processes employing the caustic solution just above discussed, special care and skill is required on the part of an attendant or operator and the same further requiring apparatus involving considerable cost in the original installation as well as in the maintenance thereof and also requiring highly technical mechanical adjustments and operations and even the application of different degrees of heat and the control thereof in some cases.

The object of the present invention is to provide a simple, yet effective and highly efficient, clarifying and reclaiming process without the use of a caustic solution or the application of heat and which may be carried out in the regular conventional tanks as heretofore installed in dry cleaning establishments and the like in the separation of the oleaginous matter from the spent solvent for the reclamation of the cleaning fluid to be re-used, and, in many cases, without necessitating any material alteration in the tank proper or the associated other parts of the apparatus.

An ideal clarifying agent that has been developed for the process of the present invention, consists of isopropyl alcohol or the equivalent product known as isopropanol, water and Intramine, the last named ingredient being commercially known by that name as a trade-name and the product, as far as the present inventor is aware, being made in accordance with and under United States Letters Patent No. 1,981,792, dated November 20, 1934, and being a sulphated condensation product of fatty acids and monoethanolamine, and commonly known and described as a "wetting agent." In this connection, it is here noted, that after many experiments with various wetting agents, Intramine is the only one found to successfully function for the purpose in the process of the present invention.

The compound for the purposes of the present invention is ordinarily mixed in the following proportions:

To five gallons of isopropyl alcohol or isopropanol, add twenty-five gallons of water and one pound of Intramine.

In the treatment of the used and spent cleaning fluid, in accordance with the present invention, the compound of the ingredients in the proportions just above noted, is placed in the hollow conical bottom portion of the recovery tank of the apparatus and the cleaning fluid to be treated is let into the tank below the layer of the treating compound in the proportion of approximately one part of treating compound to nine parts of the cleaning fluid to be clarified and reclaimed, that is to say, in the bottom portion of a 100 gallon tank there should be 10 gallons of the compound constituting a 24-inch layer or stratum through which 90 gallons of the dirty cleaning fluid pumped into the tank is allowed to percolate slowly upward through this layer of the clarifying compound and the recovery of the cleaning fluid so treated being accomplished at a certain level above the layer of treating material.

In carrying out the process of the present invention, the dirty solvent is not forced through the clarifying agent under a high pressure, but only at or about a 10 pound pressure, or less, if sufficient to cause the tank to gradually fill with the treated fluid to its fullest capacity. When the solvent has passed upwardly through the layer of clarifying agent or compound it is slowly drawn off at a level sufficiently above the layer or stratum of the clarifying agent or compound to allow the foreign matter in the treated solvent to settle or remain on the top of or in the body of the clarifying agent, as the case may be, while the separated oily substance which floats above the body of the clarified fluid may be drawn off at its particular level in the tank before decanting the clarified fluid. As there will be much foreign matter deposited in and upon the body of the clarifying agent or compound as the dirty solvent passes upwardly therethrough, there will, in time, greatly accumulate over the top of the body or clarifying agent, a layer of foreign matter separated from the treated solvent.

The clarifying agent or compound deposited in the bottom portion of the recovery tank may be used continuously until it becomes so clogged with foreign matter that it fails to function. The life of the clarifying agent or compound as thus deposited and used in the recovery tank is dependent largely upon the amount of foreign matter in the dirty solvent passed through it.

In the process of the present invention no heat is used and it is not necessary to employ complicated apparatus requiring any high degree of skill in the operation and control of the same. Furthermore, the mixture of isopropyl alcohol or isopropanol, water and Intramine separates in the dirty solvent not only the soap, dirt, filth and other accumulations of foreign matter, but also all oils which would otherwise be held in suspension in the emulsion in the treated solvent.

It is here noted that the cleaning fluid for the treatment and reclamation of which the process of the present invention is more particularly and primarily intended is petroleum naphtha or what is commonly known in the dry cleaning industry as Stoddard solvent, but without absolute limitation thereto, although, obviously, the cleaning fluid must be of the same general characteristic in its original form and with the foreign substance content after use, it being further pointed out that, by the use of the isopropyl alcohol or isopropanol ingredient in the compounded clarifying agent, the oleaginous substance is thoroughly separated from the original basic emulsion of the cleaning fluid, the action of which is augmented and hastened by the effect of the characteristic wetting agent such as Intramine, said two ingredients mixed with water substantially in the proportions hereinbefore stated also bringing about a quick separation and precipitation of the dirt, filth and other foreign substances or particles in the cleaning fluid being treated.

What is claimed is:

1. The process of clarifying and reclaiming used and spent solvents of the character described, consisting in forcing such solvent upwardly through a confined body of a compounded mixture of isopropyl alcohol, water and a sulphated condensation product of fatty acids and monoethanolamine causing relatively heavy substances to remain in or float on the upper surface of the clarifying mixture and the clarified solvent float above the same, and decanting the clarified solvent therefrom at a point some distance above the heavy substance and below the upper level thereof.

2. The process of clarifying and reclaiming used and spent solvents of the character described, consisting in forcing such solvent under low pressure upwardly through a confined body of a compounded mixture of isopropyl alcohol, water and a sulphated condensation product of fatty acids and monoethanolamine causing relatively heavy substances to remain in or float on the upper surface of the clarifying mixture and the clarified solvent float above the same and an oily substance to float above the body of the clarified liquid, decanting the oily substance, and decanting the clarified solvent therefrom at a point some distance above the heavy substance and below the oily substance.

COLIN C. JONES.